US011979723B2

(12) United States Patent
Neoran et al.

(10) Patent No.: US 11,979,723 B2
(45) Date of Patent: May 7, 2024

(54) CONTENT BASED SPATIAL REMIXING

(71) Applicant: Waves Audio Ltd., Tel Aviv (IL)

(72) Inventors: Itai Neoran, Beit Hananya (IL); Matan Ben-Asher, Neve Monosson (IL); Itamar Davidesco, Beit-Hilkiya (IL); Idan Egozy, Pardesiya (IL)

(73) Assignee: Waves Audio Ltd., Tel Aviv (IL)

( * ) Notice: Subject to any disclaimer, the term of this patent is extended or adjusted under 35 U.S.C. 154(b) by 254 days.

(21) Appl. No.: 17/706,640

(22) Filed: Mar. 29, 2022

(65) Prior Publication Data

US 2022/0337952 A1 Oct. 20, 2022

(30) Foreign Application Priority Data

Apr. 19, 2021 (GB) ..................................... 2105556

(51) Int. Cl.
*H04S 7/00* (2006.01)
*H04R 5/04* (2006.01)

(52) U.S. Cl.
CPC ............... *H04R 5/04* (2013.01); *H04S 7/307* (2013.01); *H04R 2205/022* (2013.01); *H04S 2400/11* (2013.01)

(58) Field of Classification Search
None
See application file for complete search history.

(56) References Cited

U.S. PATENT DOCUMENTS

| | | | | |
|---|---|---|---|---|
| 7,412,380 | B1 | 8/2008 | Avendano et al. | |
| 10,705,338 | B2 | 7/2020 | Ben-Asher | |
| 2017/0098452 | A1* | 4/2017 | Tracey | G10L 19/26 |
| 2018/0210695 | A1 | 7/2018 | Tsingos et al. | |

OTHER PUBLICATIONS

IEEE International Conference on Acoustics, 2018, Ibrahim Karim Met Al, “Primary-Ambient Source Separation for Upmixing to Surround Sound Systems”, pp. 431-435.
AES Convention 131, 2011, Faller Christof et al, “Binaural Reproduction of Stereo Signals Using Upmixing and Diffuse Rendering” Sections 2, 3.3; figure 2.

(Continued)

*Primary Examiner* — James K Mooney
(74) *Attorney, Agent, or Firm* — Dr. Hanan Farber Patent Agent Ltd.

(57) ABSTRACT

A trained machine configured to input a stereo sound track and separate the stereo sound track into multiple N separated stereo audio signals respectively characterized by multiple N audio content classes. All stereo audio as input in the stereo sound track is included in the N separated stereo audio signals. A mixing module is configured to spatially localize symmetrically and without cross-talk, between left and right, the N separated stereo audio signals into multiple output channels. The output channels include respective mixtures of one or more of the N separated stereo audio signals. Gain is adjusted of the output channels into left and right binaural outputs to conserve summed levels of the N separated stereo audio signals distributed over the output channels.

19 Claims, 6 Drawing Sheets

(56) References Cited

OTHER PUBLICATIONS

S. Uhlich and M. Porcu and F. Giron and M. Enenkl and T. Kemp and N. Takahashi and Y.Mitsufuji, "Improving music source separation based on deep neural networks through data augmentation and network blending." 2017 IEEE International Conference on Acoustics, Speech and Signal Processing (ICASSP). IEEE, 2017.
Aditya Arie Nugraha, Antoine Liutkus, Emmanuel Vincent. Deep neural network based multichannel audio source separation. Audio Source Separation, Springer, pp. 157-195, 2018, 978-3-319-73030-1. 10.1007/978-3-319-73031-8_7. hal-01633858.
Foreign priority case 2105556.1.
Proceedings of the 2nd AES Workshop on Intelligent Music Production, London, UK, Sep. 13, 2016 Music Remixing and Upmixing Using Source Separation Gerard Roma, Emad M. Grais, Andrew J. R. Simpson, Mark D. Plumbley Centre for Vision, Speech and Signal Processing, University of Surrey.

* cited by examiner

CONTENT BASED SPATIAL REMIXING

BACKGROUND

1. Technical Field

Aspects of the present invention relate to digital signal processing of audio, particularly audio content recorded in stereo and separation based on content and remixing.

2. Description of Related Art

Psycho-acoustics relate to human perception of sound. A sound generated in a live performance, interacts acoustically with the environment, e.g. walls and seats of a concert hall. After propagating through the air and before arriving at the eardrum, a sound wave undergoes filtering and delays due to the size and shape of head and ears. Left and right ears receive signals differing slightly in level, phase, and time delay. A human brain processes simultaneously the signals received from both auditory nerves and derives spatial information related to location, distance, speed and environment of the source of the sound.

In a live performance recorded in stereo with two microphones, each microphone receives audio signals with time delays relating to the distances between the audio sources and the microphones. When recorded stereo is played using a stereo sound reproduction system with two loudspeakers, original time delays and levels are reproduced of the various sources to the microphones as recorded. The time delays and levels provide the brain with a spatial sense of the original sound sources. Moreover, both left and right ears receive audio from both the left and right loudspeakers, a phenomenon known as channel cross-talk. However, if the same content is reproduced on a headset, the left channel plays to only the left ear and the right channel plays only to the right ear, without reproducing channel cross-talk.

In a virtual binaural reproduction system using a headset with left and right channels, direction dependent head-related transfer functions (HRTF) may be used to simulate the filtering and delay effect due to the size and shape of our head and ears. Static and dynamic cues may be included to simulate acoustic effects and motion of audio sources within the concert hall. Channel cross-talk may be restored. Taken together, these techniques may be used to virtually localize in two or three dimensional space the original audio sources and to provide a spatial acoustic experience to the user.

BRIEF SUMMARY

Various computerized systems and methods are described herein including a trained machine configured to input a stereo sound track and separate the stereo sound track into multiple N separated stereo audio signals respectively characterized by multiple N audio content classes. Essentially all stereo audio as input in the stereo sound track is included in the N separated stereo audio signals. A mixing module is configured to spatially localize symmetrically and without cross-talk, between left and right, the N separated stereo audio signals into multiple output channels. The output channels include respective mixtures of one or more of the N separated stereo audio signals. Gain is adjusted of the output channels into left and right binaural outputs to conserve summed levels of the N separated stereo audio signals distributed over the output channels. The N audio content classes may include: (i) dialogue (ii) music, and (iii) sound effects. A binaural reproduction system may be configured to binaurally render the output channels. The gains may be summed in phase within a previously determined threshold, to suppress distortion arising during the separation of the stereo sound track into the N separated stereo audio signals. The binaural reproduction system may be further configured to spatially relocalise one or more of the N separated stereo audio signals by linear panning. The sum of audio amplitudes, of the N separated stereo audio signals as distributed over the output channels, may be conserved. The trained machine may be configured to transform the input stereo soundtrack into an input time-frequency representation and to process the time-frequency representation and output therefrom multiple time-frequency representations corresponding to the respective N separated stereo audio signals. For a time-frequency bin, a sum of magnitudes of the output time-frequency representations is within a previously determined threshold of a magnitude of the input time-frequency representation. The trained machine may be configured to output multiple N−1 of the time-frequency representations from the trained machine, and compute the $N^{th}$ time-frequency representation as a residual time-frequency representation by subtracting for a time-frequency bin a sum of magnitudes of the N−1 time-frequency representations from a magnitude of the input time-frequency representation. The trained machine may be configured to prioritize at least one of the N audio content classes as a prior audio content class, and serially process the prior audio content class by separating the stereo sound track into the separate stereo audio signal of the prior audio content class prior to the other N−1 audio content classes. The prior audio content class may be dialogue. The trained machine may be configured to process the output time-frequency representations by extracting information from the input time-frequency representation for phase restoration.

Computer readable media are disclosed herein storing instructions for executing computerized methods as disclosed herein.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1:
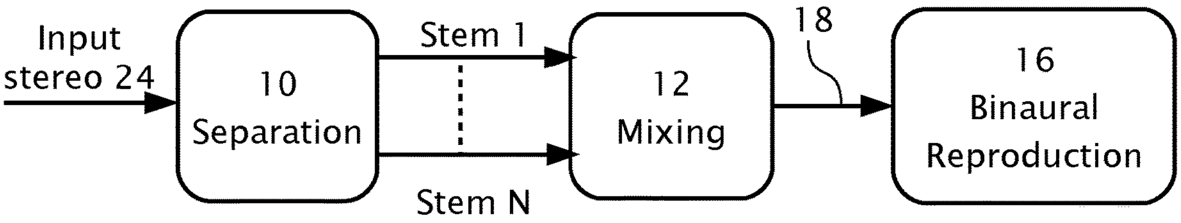
FIG. 1 illustrates a simplified schematic diagram of a system, according to an embodiment of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to the like elements throughout. The features are described below to explain the present invention by referring to the figures.

While sound mixing for motion pictures, audio content may be recorded as separate audio content classes, e.g. dialogue, music and sound effects, also referred to herein as "stems". Recording as stems facilitates replacing dialogue with foreign language versions and also adapting the sound track to different reproduction systems, e.g. monaural, binaural and surround sound systems.

However, legacy films have a sound track including audio content classes, e.g. dialogue, music and sound effects previously recorded together, e.g in stereo with two microphones.

Separation of the original audio content into stems may be performed using one or more previously trained machines, e.g. neural networks. Representative references which describe separation of the original audio content into audio content classes using neural networks include:

Acidity Arie Nugraha, Antoine Liutkus, Emmanuel Vincent. Deep neural network based multichannel audio source separation. Audio Source Separation, Springer, pp. 157-195, 2018, 978-3-319-73030-1

S. Uhlich and M. Porcu and F. Giron and M. Enenkl and T. Kemp and N. Takahashi and Y. Mitsufuji, "Improving music source separation based on deep neural networks through data augmentation and network blending." 2017 IEEE International Conference on Acoustics, Speech and Signal Processing (ICASSP). IEEE, 2017

Original audio content may not be perfectly separable and audible artifacts or distortion in the separated content may result from the separation process. The separated audio content classes or stems may be virtually localized in two dimensional or three dimensional space and remixed into multiple output channels. The multiple output channels may be input to an audio reproduction system to create a spatial sound experience. Features of the present invention are directed to remixing and/or virtually localizing the separated audio content classes in such a way as to reduce or cancel at least in part artifacts generated by an imperfect separation process.

Referring now to the drawings, reference is now made to FIG. 1, a simplified schematic diagram of a system according to an embodiment of the present invention. An input stereo signal 24 which may have been previously recorded may be input into a separation block 10. Separation block 10 separates input stereo 24 into multiple, e.g. N audio content classes or stems. By way of example, input stereo 24 may be a sound track of a motion picture and separation block 10 may separate sound track 2 into N=3 audio content classes: (i) dialogue (ii) music, and (iii) sound effects. Mixing block 12 receives separated stems 1 . . . N and is configured to remix and virtually localize separated stems 1 . . . N. The localization may be previously set by a user, correspond to a surround sound standard, e.g. 5.0, 7.1, or free localization in a surround plane or in three dimensional space. Mixing block 12 is configured to produce a multi-channel output 18 which may be stored or otherwise played on a binaural audio reproduction system 16. Waves Nx™ Virtual Mix Room (Waves Audio Ltd.) is an example of binaural audio reproduction system 16. Waves Nx™ is designed to reproduce an audio mix in spatial context, with either a stereo or a surround speaker configuration using a conventional headset including left and right physical on-ear or in-ear loudspeakers.

Separation of Input Stereo Signal into Audio Content Classes

Figure 2:
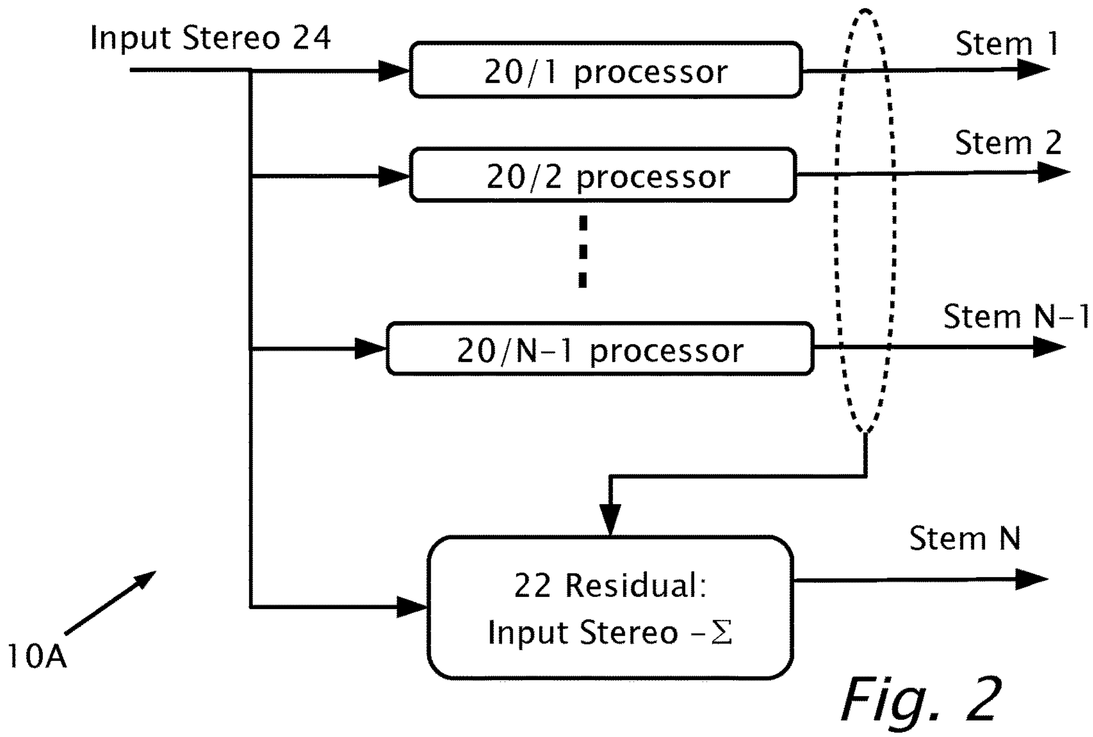
FIG. 2 illustrates an embodiment of a separation module, according to features of the present invention, configured to separate an input stereo signal into N audio content classes or stems.

Reference is now made also to FIG. 2, which illustrates an embodiment 10A of separation block 10, according to features of the present invention, configured to separate input stereo signal 24 into N audio content classes or stems. Input stereo signal 24, which may be sourced from a stereo motion picture audio track may be input in parallel to multiple N−1 processors 20/1 to 20/N−1 and to residual block 22. Processors 20/1 to 20/N−1 are configured respectively to mask or filter input stereo 24 to produce stems 1 to N−1.

Processors 20/1 to 20/N−1 may be configured as trained machines, e.g. supervised machine learning for outputting stems 1 . . . N−1. Alternatively or in addition, unsupervised machine learning algorithms may be used such as principle component analysis. Block 22 may be configured to sum together stems 1 to N−1 and may subtract the sum from input stereo signal 24 to produce a residual output as stem N so that summing audio signals from stems 1 . . . N substantively equals input stereo 24 within a previously determined threshold.

By way of example of N=3 stems, processor 20/1 masks input stereo 24 and outputs an audio signal stem 1, e.g. dialogue audio content. Processor 20/2 masks input stereo 24 and outputs stem 2, e.g. musical audio content. Residual block 22 outputs stem 3, essentially all other sound, e.g. sound effects, contained in input stereo 24 not masked out by processors 20/1 and 20/2. By using residual block 22, essentially all sound included in original input stereo 24 is included in stems 1 to 3. According to a feature of the present invention, stems 1 to N−1 may be computed in frequency domain and the subtraction or comparison performed in block 22 to output stem N may be in time domain, thus avoiding a final inverse transform.

Figure 3:
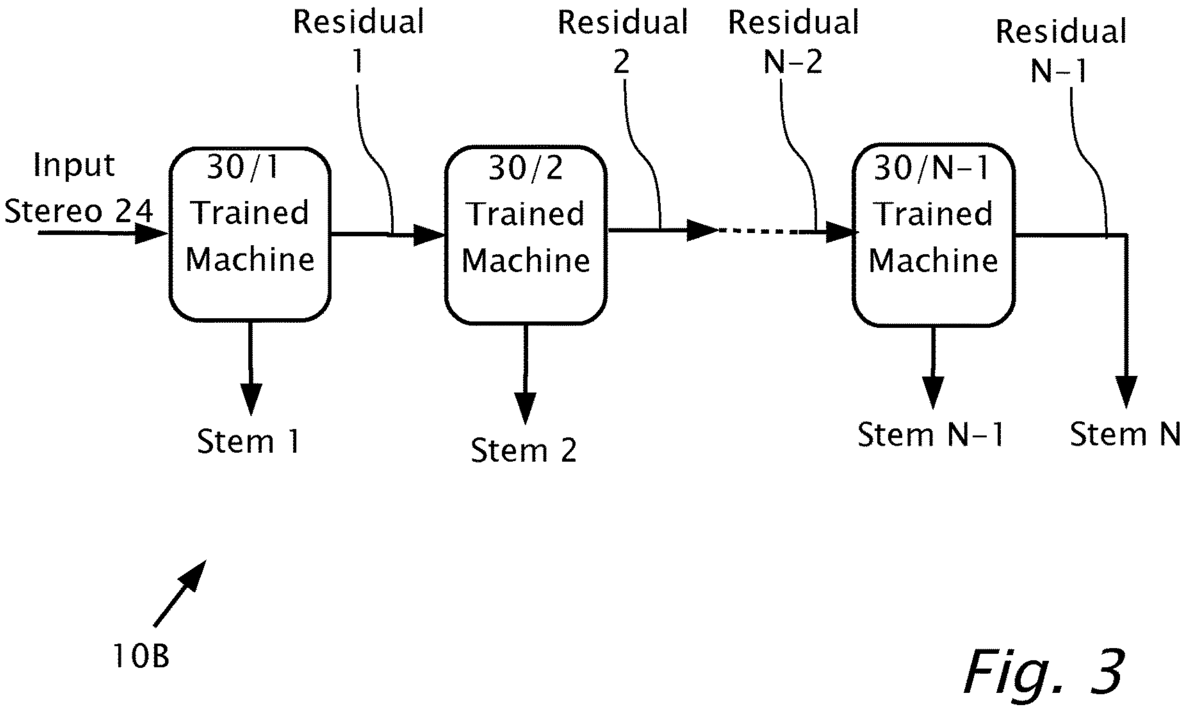
FIG. 3 illustrates another embodiment of a separation module, according to features of the present invention, configured to separate an input stereo signal into N audio content classes or stems.

Reference is now made also to FIG. 3, which illustrates another embodiment 10B of separation block 10, according to features of the present invention, configured to separate an input stereo signal into N audio content classes or stems. Trained machine 30/1 inputs input stereo 24, and masks out stem 1. Trained machine 30/1 is configured to output residual 1 originally sourced from input stereo 24 including sound of input stereo 24 other than stem 1. Residual 1 is input to trained machine 30/2. Trained machine 30/2 is configured to mask out stem 2 from residual 1 and output residual 2 which includes sound of input stereo 24 other than stems 1 and 2. Similarly, trained machine 30/N−1 is configured to mask out stem N−1 from residual N−2. Residual N−1 becomes stem N. As in separation block 10A, all sound included in original input stereo 24 is included in stems 1 to N within a previously determined threshold. Moreover, separation block 10B is processed serially so that the most important stem, e.g. dialogue, may be optimally masked with the least distortion and artifacts due to imperfect separation may tend to be integrated into a subsequently masked stem, stem 3 e.g. sound effects.

Figure 4:
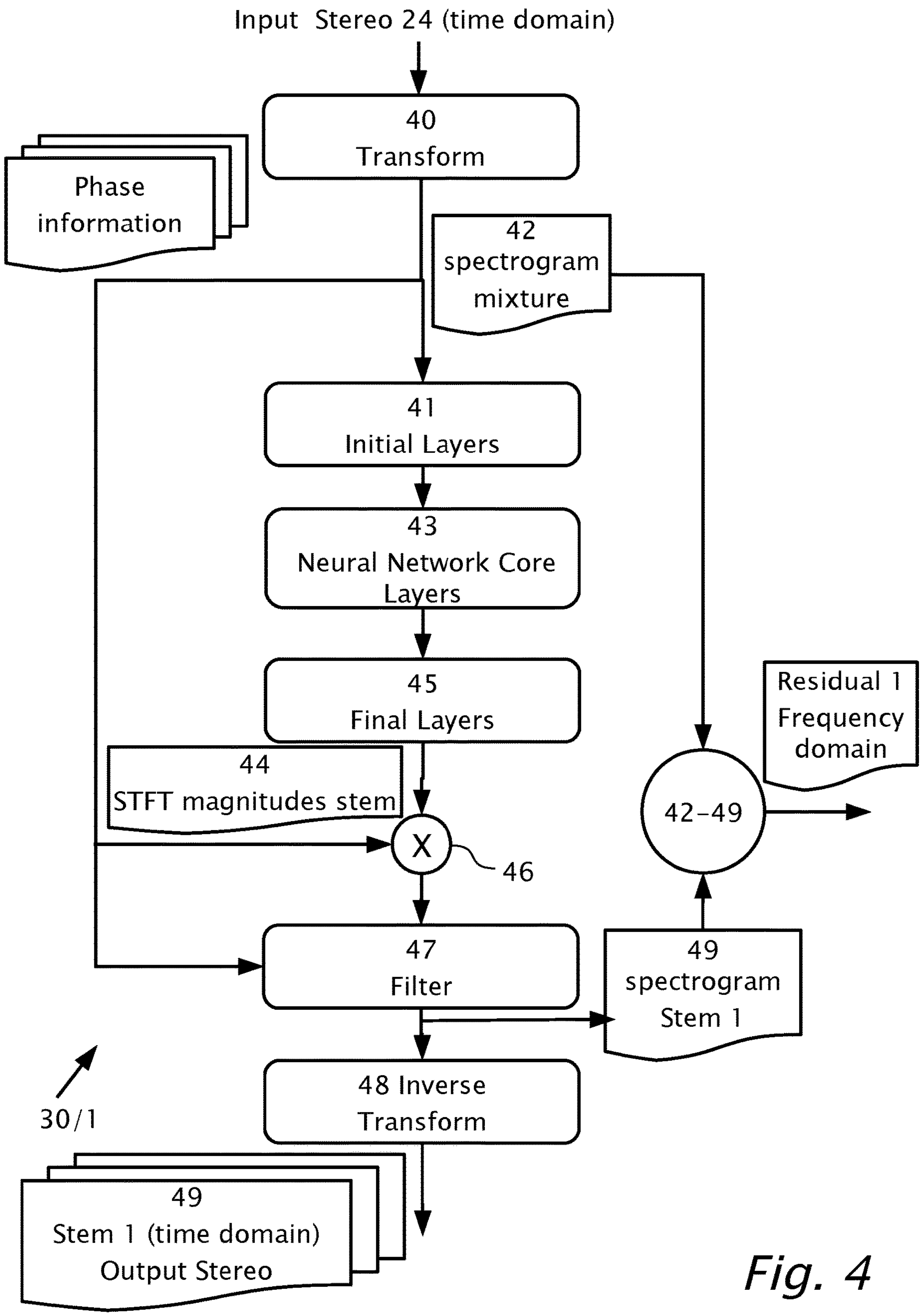
FIG. 4 illustrates details of a trained machine, according to features of the present invention.

Reference is now also made to FIG. 4, a block diagram which schematically illustrates details of trained machine 30/1 by way of example, according to features of the present invention. In block 40, input stereo 24 may be parsed in the time domain and transformed into a frequency representation, e.g. short time Fourier transform (STFT). Short time Fourier transform (STFT) 40 may be performed by sampling, e.g. 45 kiloHertz using an overlap-add method. A time-frequency representation 42 e.g. real valued spectrogram of the mixture, derived from STFT may be output or stored. Neural network initial layers 41 may crop the frequency up to a maximum frequency, e.g. 16 kiloHertz and scale STFT to be more robust against variations of input level such as by expressing STFT relative to a mean magnitude and dividing by a standard deviation of magnitude. Initial layers 41 may include, by way of example, a fully connected layer followed by a batch normalization layer; and finally a non-linear layer such as a hyperbolic tangent (tanh) or sigmoid. Data output from initial layers 41 may be input into a neural network core 43 which, in different configurations, may include a recurrent neural network, e.g. long short-term memory (LSTM) of three layers, which normally operates on time-series data. Alternatively or in addition, neural network core 43 may include a convolutional neural network (CNN) configured to receive two dimensional data such as a spectrogram in time-frequency space. Output data from neural network core 43 may be input to final layers 45 which may include one or more layered structures including a fully connected layer followed by a batch normalization layer. Rescaling performed in initial layers 41 may be reversed. Finally, a non-linear layer, e.g. rectified linear unit, sigmoid or hyperbolic tangent (tanh) outputs from block 45 transformed frequency data 44, e.g. amplitude spectral densities corresponding to stem 1, e.g. dialogue. However, in order to generate an estimate of stem 1 in the time domain, complex coefficients including phase information may be restored.

Simple Wiener filtering or multi-channel Wiener filtering 47 may be used for estimating complex coefficients of the frequency data. Multichannel Wiener filtering 47 is an iterative procedure using expectation maximization A first estimate for the complex coefficients may be extracted from the STFT frequency bins 42 of the mixture and multiplied 46 with corresponding frequency magnitudes 44 output from post-processing block 45. Wiener filtering 47 assumes that the complex STFT coefficients are independent zero mean Gaussian random variables and under these assumptions a minimum mean squared error is computed of variances of sources for each frequency. The output of Wiener filter 47, STFT of stem 1, may be inverse transformed (block 48) to generate an estimate of stem 1 in time-domain. Trained machine 30/1 may compute in frequency domain output residual 1, by subtracting real-valued spectrogram 49 of stem 1 from spectrogram 42 of the mixture as output from transform block 40. Residual 1 may be output to trained machine 30/2 which may operate similarly as trained machine 30/1 however, as residual 1 is already in frequency domain, transform 40 is superfluous in trained machine 30/2. Residual 2 is output from trained machine 30/2 by subtracting, in frequency domain, STFT stem 2 from residual 1.

Mixing and Spatial Localization of Audio Content Classes

Referring again to FIG. 1, separation 10 into audio content classes may be constrained so that all the stereo audio as originally recorded, e.g. in a legacy motion picture stereo audio track, is included in the separated audio content classes, i.e. stems 1-3 (within a previously determined threshold). Stems 1 . . . N, e.g. N=3, dialogue, music and sound effects are mixed and localized in mixing block 12. Mixing block 12 may be configured to virtually map separated N=3 stems: dialogue, music and sound effects to virtual locations around a listener's head.

Figure 5A:
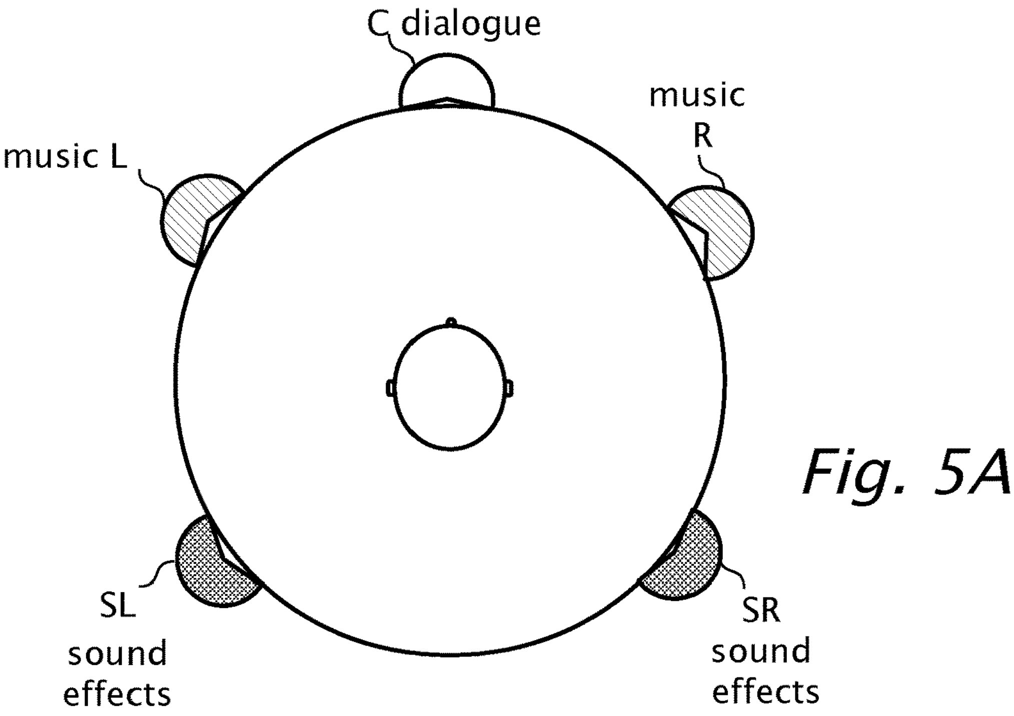
FIG. 5A illustrates an exemplary mapping of separated audio content classes, i.e. stems, to virtual locations or virtual speakers around a listener's head, according to features of the present invention.

Reference is now also made to FIG. 5A which illustrates an exemplary mapping by mixing block 12, of separated N=3 stems: dialogue, music and sound effects to virtual locations or virtual speakers around a listener's head, over multichannel output 18. Five output channels are shown: center C, left L, right R, surround left SL and surround SR. Stem 1, e.g. dialogue, is shown mapped to a front center location C. Stem 2, e.g. music, is shown mapped to forward left L and right R locations shown hatched in −45 degree lines. Stem 3, e.g. sound effects, are shown cross hatched mapped to rear surround left (SL) and surround right (SR) locations.

Figure 6:
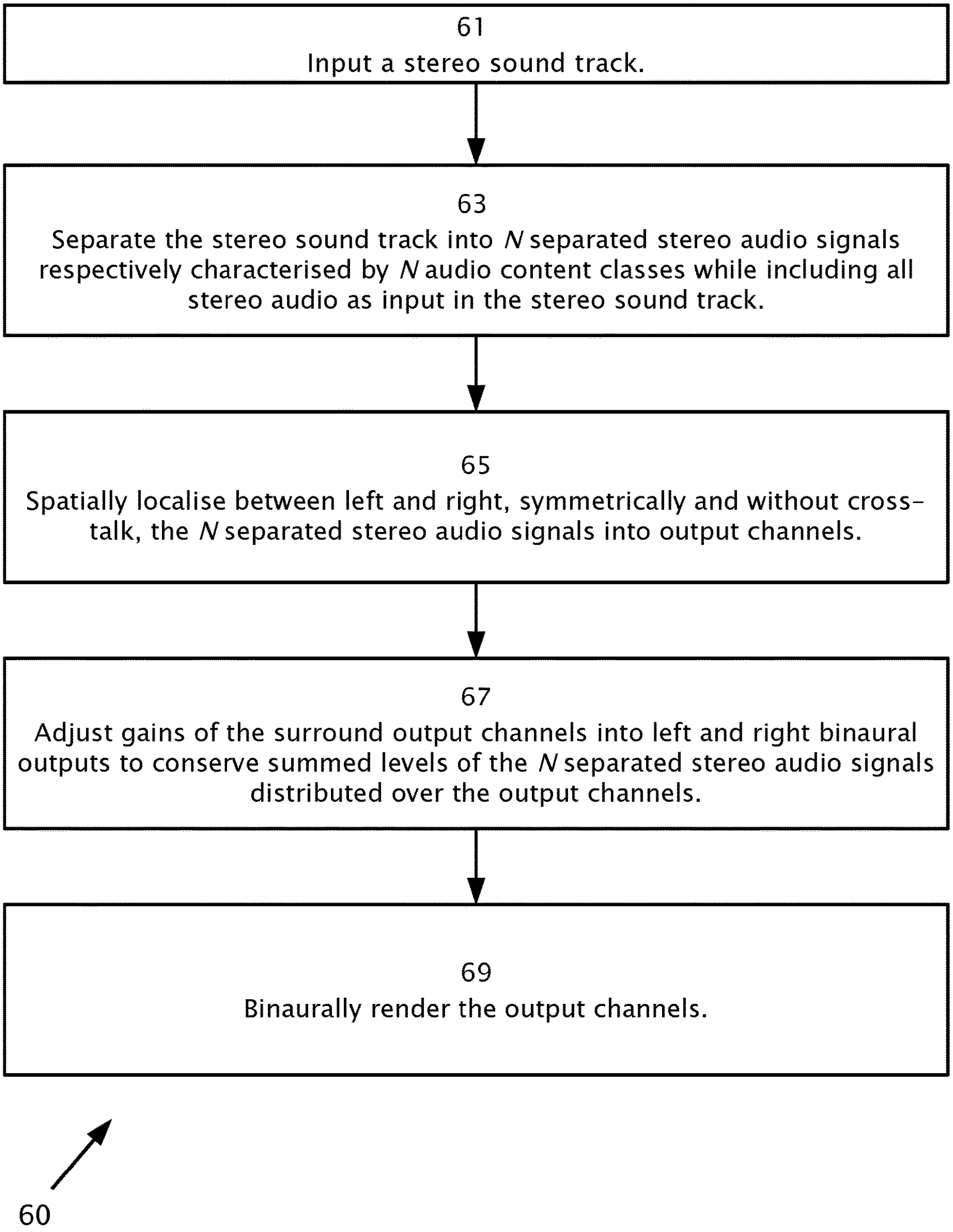
FIG. 6 is a flow diagram illustrating a method according to the present invention.

Reference is now also made to FIG. 6, which illustrates a flow diagram 60 of a computerized process for mixing, by mixing module 12 into multiple channels 18 according to features of the present invention, to minimize artifacts from separation 10. A stereo sound track is input (step 61) and separated (step 63) into N separated stereo audio signals characterized by N audio content classes. Separation (step 63) of input stereo 24 into separate stereo audio signals of respective audio content classes may be constrained so that all the audio as originally recorded is included in the separated audio content classes. Mixing block 12 is configured to spatially localize between left and right, the N separated stereo audio signals into output channels.

Spatial localization (step 65) may be performed symmetrically between left and right and without cross-talk, between left and right sides of stereo. In other words, sound originally recorded in input stereo 24 in a left channel is spatially localized (step 65) only in one or more left output channels (or center speaker) and similarly sound originally recorded in input stereo 24 in a right channel is spatially localized in one or more right channels (or center speaker).

Gains may be adjusted (step 67) of the output channels into left and right binaural outputs to conserve summed levels of the N separated stereo audio signals distributed over the output channels.

The output channels 18 may be binaurally rendered (step 69) or alternatively reproduced in a stereo loudspeaker system.

Figure 5B:
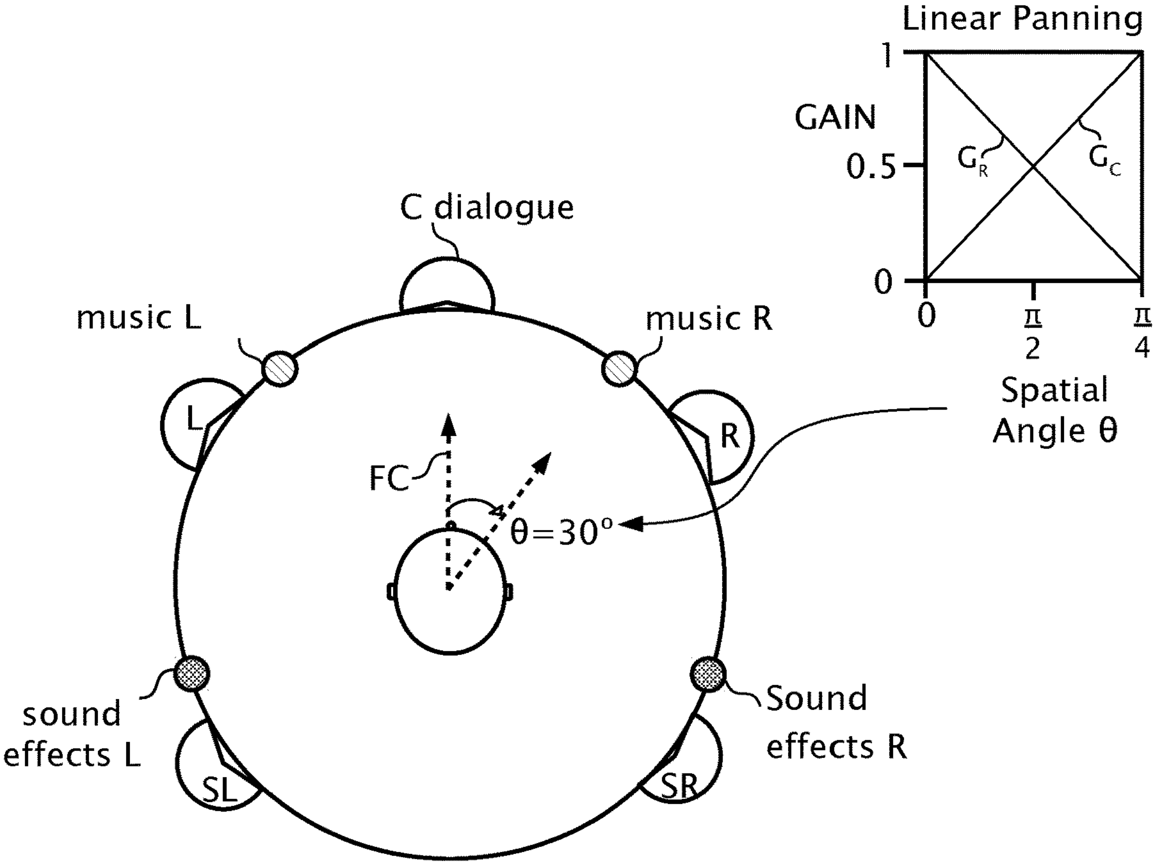
FIG. 5B illustrates an example of spatial localization of separated audio content classes, i.e. stems, according to features of the present invention.

Reference is now made to FIG. 5B, illustrating an example of spatial localization of separated audio content classes, i.e. stems, according to features of the present invention. Stem 1, e.g. dialogue, is shown localized at the front center virtual speaker C as shown in FIG. 5A. Stem 2, music L and R (hatched −45 lines) are symmetrically relocated compared with FIG. 5A to front left and front right at about ±30 degrees from front center line (FC) in sagittal plane. Stem 3, sound effects (cross-hatched) are symmetrically relocated between left and right at about ±100 degrees from front center line. According to a feature of the present invention, spatial relocalization may be performed by linear panning. By way of example, spatial angle θ=+30 degrees $$\left(\frac{\pi}{6}\text{ radians}\right)$$

is shown of spatial relocalization of music R. Gain $G_C$ of music R is added to the center virtual speaker C and gain $G_R$ of right virtual speaker R is reduced linearly. Graphs of gain $G_C$ of music R in center virtual speaker C and gain $G_R$ of music R in right virtual speaker R are shown in an insert. Axes are gain (ordinate) against spatial angle θ (abscissa) in radians. Gain $G_C$ of music R in center virtual speaker C and gain $G_R$ of music R in right virtual speaker R vary according to the following equations.

$$G_R = \left(\frac{\pi}{4} - \theta\right) \cdot \left(\frac{4}{\pi}\right)$$

$$G_C = \theta \cdot \left(\frac{4}{\pi}\right)$$

For spatial angle, θ=+30 degrees $$\left(\frac{\pi}{6} \text{ radians}\right),$$

$G_C=1/3$ and $G_R=2/3$.

While linear panning, phases of the audio signal of music R from both the center virtual speaker C and from right virtual speaker R are reconstructed so that the normalized power of the two contributions to music R adds to or approaches unity for any spatial angle θ. Moreover, if separation (block 10, step 63) is not perfect and a dialogue peak in the right channel in frequency representation was separated into the music R stem, then linear panning under the conditions of preserving phase tends to restore at least in part the errant dialogue peak back with correct phase into the center virtual speaker which is rendering the dialogue stem, tending to correct for or suppress the distortion caused by the imperfect separation.

Figure 5C:
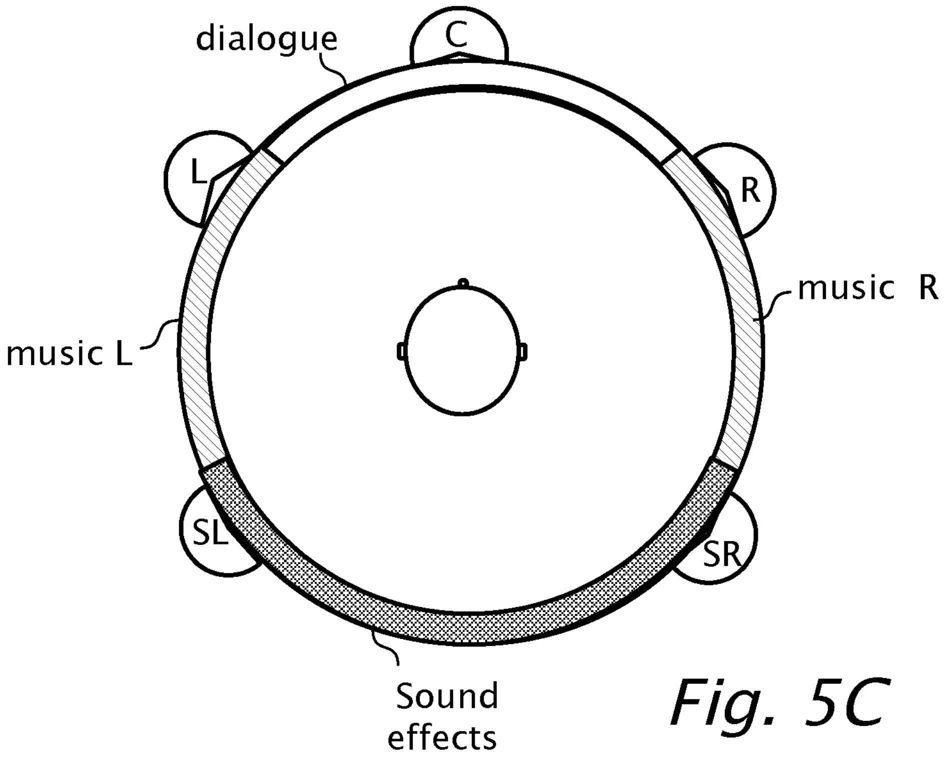
FIG. 5C illustrates an example of envelopment by separated audio content classes, i.e. stems, according to features of the present invention.

Reference is now made to FIG. 5C, illustrating an example of envelopment of separated audio content classes, i.e. stems, according to features of the present invention. Envelopment refers to the perception of sound being all around the listener, with no definable point source. Separated N=3 stems: dialogue, music and sound effects are shown enveloping a listener's head over wide angles. Stem 1, e.g. dialogue, is shown generally coming from the forward direction over a wide angle. Stem 2, e.g. music left and right are shown coming over wide angles as shown hatched in −45 degree lines. Stem 3, e.g. sound effects, are shown cross hatched enveloping listener's head over a wide angle from the rear.

Spatial envelopment (step 65) is performed symmetrically between left and right and without cross-talk, between left and right sides of stereo. In other words, sound originally recorded in input stereo 24 in a left channel is spatially distributed (step 65) from only left output channels (or center speaker) and similarly sound originally recorded in input stereo 24 in a right channel is spatially distributed from one or more right channels (or center speaker). Phases are preserved so that the normalized gains in spatially distributed output channels on the left sum to unity gain of left input stereo 24 and similarly spatially distributed output channels on the right sum to unity gain for right input stereo 24.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, transitory and/or non-transitory which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic or solid state storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data. The term "network" may include wide area network, Internet local area network, Intranet, wireless networks such as "Wi-Fi", virtual private networks, mobile access network using access point name (APN) and Internet. Exchanged data may be in the form of electrical signals that are meaningful to the two or more computer systems. When data is transferred or provided over a network or another communications connection (either hard wired, wireless, or a combination of hard wired or wireless) to a computer system or computer device, the connection is properly viewed as a computer-readable medium. Thus, any such connection is properly termed a computer-readable medium. Combinations of the above should also be included within the scope of computer-readable media. Thus, computer readable media as disclosed herein may be transitory or non-transitory. Computer-executable instructions comprise, for example, instructions and data which cause a general-purpose computer system or special purpose computer system to perform a certain function or group of functions.

The term "server" as used herein, refers to a computer system including a processor, data storage and a network adapter generally configured to provide a service over the computer network. A computer system which receives a service provided by the server may be known as a "client" computer system.

The term "sound effects" as used herein refers to artificially created sound or an enhanced sound used to set mood, simulate reality or create an illusion in a motion picture. The term "sound effect" as used herein includes "foleys" which are sounds added to a production to provide a more realistic sense to the motion picture.

The term "source" or "audio source" as used herein refers one or more sources of sound in a recording. Sources may include vocalists, actors/actresses, musical instruments and sound effects, which may be sourced in recordings or synthesized The term "audio content class" as used herein refers to a classification of audio sources which may depend on the type of content, by way of example (i) dialogue (ii) music, and (iii) sound effects are suitable audio content classes for an audio track of a motion picture. Other audio content classes may be contemplated depending on type content, for instance: strings, woodwinds, brass and percussion for a symphony orchestra. The term "stem" and "audio content class" are used herein interchangeably.

The term "spatially localizing" or "localizing" refers to angular or spatial placement in two or three dimensions relative to the head of a listener of one or more audio sources or stems. The term "localizing" includes "envelopment" in which audio sources sound to the listener as being spread out angularly and/or by distance.

The term "channels" or "output channels" as used herein refers to a mixture of audio sources as recorded or audio content classes as separated, rendered for reproduction.

The term "binaural" as used herein refers to hearing with both ears as with a headset or with two loudspeakers. The term "binaural rendering" or "binaural reproduction" refers to playing output channels, for example with localization to provide a spatial audio experience in two or three dimensions.

The term "conserved" as used herein referring to a sum of gains equals or approaches a constant. For normalized gains, the constant equals or approaches unity gain.

The term "stereo" as used herein refers to sound recorded with two microphones left and right and rendered with at least two output channels, left and right.

The term "cross-talk" as used herein refers to rendering at least of a portion of sound recorded in a left microphone to a right output channel or similarly rendering at least of a portion of sound recorded in a right microphone in a left output channel.

The term "symmetrically" as used herein refers to bilateral symmetry of localization about a sagittal plane, which divides a virtual listener's head into two mirror image left and right halves.

The term "sum" or "summing" as used herein in context of audio signals refers to combining the signals including respective frequencies and phases. For fully incoherent and/or uncorrelated audio waves, summing may refer to summing by energy or power.

For audio waves fully correlated in phase and frequency, summing may refer to summing respective amplitudes.

The term "panning" as used herein refers to adjusting a level, dependent on a spatial angle and in stereo simultaneously adjusting levels of right and left output channels.

The terms "moving picture", "movie", 'motion picture", "film" are used herein interchangeably and refers to a multimedia production in which a sound track is synchronized with video or moving pictures.

Unless otherwise indicated, the term "previously determined threshold" is implicit in the claims when appropriate, for instance "is conserved" means "is conserved within a previously determined threshold"; "without cross-talk" means "without cross-talk within a previously determined threshold", by way of example. Similarly, the terms "all", "essentially all", "substantively all" refer to within a previously determined threshold.

The term "spectrogram" as used herein is a two-dimensional data structure in time-frequency space.

The indefinite articles "a", "an" is used herein, such as "a time-frequency bin", "a threshold" have the meaning of "one or more" that is "one or more time-frequency bins" or "one or more thresholds".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The invention claimed is:

1. A computerized method comprising:

inputting a stereo sound track;

separating the stereo sound track into a plurality of N separated stereo audio signals respectively characterized by a plurality of N audio content classes, while including within a first previously determined threshold all stereo audio as input in the stereo sound track in the N separated stereo audio signals;

binaurally rendering the N separated stereo audio signals into a plurality of output channels for use with a headset or stereo speakers, wherein audio amplitudes are summed in phase within a second previously determined threshold, thereby suppressing distortion arising during said separating the stereo sound track into the N separated stereo audio signals wherein the output channels include respective mixtures of one or more of said N separated stereo audio signals; wherein the binaural rendering includes hearing with both ears with virtual spatial localization of at least one of the N audio content classes, wherein sound originally recorded in a left channel is rendered in one or more left output channels and sound originally recorded in a right channel is rendered in one or more right channels; and adjusting gains of the output channels into left and right binaural outputs to conserve summed levels of the N separated stereo audio signals distributed over the output channels.

2. The computerized method of claim 1, wherein the N audio content classes include: (i) dialogue (ii) music, and (iii) sound effects.

3. The computerized method of claim 1, further comprising:

spatially relocalizing one or more of the N separated stereo audio signals by panning.

4. The computerized method of claim 3, further comprising:

wherein the panning is linear, wherein a sum of audio amplitudes of the N separated stereo audio signals distributed over the output channels is conserved.

5. The computerized method of claim 1, further comprising:

transforming the input stereo soundtrack into an input time-frequency representation;

processing the time-frequency representation by a trained machine and outputting therefrom a plurality of time-frequency representations corresponding to the respective N separated stereo audio signals, wherein for a time-frequency bin, a sum of magnitudes of the time-frequency representations is within a previously determined threshold of a magnitude of the input time-frequency representation.

6. The computerized method of claim 5, further comprising:

said outputting a plurality of N−1 of the time-frequency representations from the trained machine;

computing the Nth time-frequency representation as a residual time-frequency representation by subtracting for the time frequency bin a sum of magnitudes of the N−1 time-frequency representations from the magnitude of the input time-frequency representation.

7. The computerized method of claim 6, further comprising:

prioritizing at least one of the N audio content classes as a prior audio content class; and serially processing said at least one prior audio content class by said separating the stereo sound track into the separate stereo audio signal of the prior audio content class prior to the other N−1 audio content classes.

8. The computerized method of claim 7, wherein the prior audio content class is dialogue.

9. The computerized method of claim 5, further comprising:

processing the time-frequency representations by extracting information from the input time-frequency representation for phase restoration.

10. A non-transitory computer readable medium storing instructions, when executed by a computer, perform the computerized method of claim 1.

11. A computerized system comprising:

a trained machine configured to input a stereo sound track and separate the stereo sound track into a plurality of N separated stereo audio signals respectively characterized by a plurality of N audio content classes, wherein all stereo audio as input in the stereo sound track is included in the N separated stereo audio signals within a first previously determined threshold;

a binaural reproduction system configured to, binaurally render the N separated stereo audio signals into a plurality of output channels, for use with a headset or stereo speakers, wherein audio amplitudes are summed in phase within a second previously determined threshold, thereby suppressing distortion arising during said separating the stereo sound track into the N separated stereo audio signals, —wherein the output channels include respective mixtures of one or more of the N separated stereo audio signals and to adjust gain of the output channels into left and right binaural outputs to conserve summed levels of the N separated stereo audio signals distributed over the output channels.

12. The computerized system of claim 11, wherein the N audio content classes include: (i) dialogue (ii) instrumental, and (iii) sound effects.

13. The computerized system of claim 11, wherein the binaural reproduction system is further configured to spatially relocalize one or more of the N separated stereo audio signals by panning.

14. The computerized system of claim 11, wherein the panning is linear, wherein a sum of audio amplitudes of the N separated stereo audio signals distributed over the output channels is conserved.

15. The computerized system of claim 11, wherein the trained machine is configured to:

transform the input stereo soundtrack into an input time-frequency representation;

process the time-frequency representation and output therefrom a plurality of time-frequency representations corresponding to the respective N separated stereo audio signals, wherein for a time-frequency bin, a sum of magnitudes of the time-frequency representations is within a previously determined threshold of a magnitude of the input time-frequency representation.

16. The computerized system of claim 15, wherein the trained machine is configured to:

output a plurality of N−1 of the time-frequency representations from the trained machine; and compute the Nth time-frequency representation as a residual time-frequency representation by subtracting for the time frequency bin a sum of magnitudes of the N−1 time-frequency representations from the magnitude of the input time-frequency representation.

17. The computerized system of claim 16, wherein the trained machine is configured to:

prioritize at least one of the N audio content classes as a prior audio content class; and serially process said at least one prior audio content class by separating the stereo sound track into the separate stereo audio signal of the prior audio content class prior to the other N−1 audio content classes.

18. The computerized system of claim 17, wherein the prior audio content class is dialogue.

19. The computerized system of claim 15, wherein the trained machine is configured to:

process the time-frequency representations by extracting information from the input time-frequency representation for phase restoration.

* * * * *